(12) United States Patent
Schmidt

(10) Patent No.: US 9,120,705 B2
(45) Date of Patent: Sep. 1, 2015

(54) REFRACTORYCERAMIC COMPOSITES AND METHODS OF MAKING

(75) Inventor: Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 1349 days.

(21) Appl. No.: 11/567,282

(22) Filed: Dec. 6, 2006

(65) Prior Publication Data

US 2007/0292690 A1 Dec. 20, 2007

Related U.S. Application Data

(63) Continuation-in-part of application No. 11/455,049, filed on Jun. 16, 2006, now Pat. No. 8,828,540.

(51) Int. Cl.
*B32B 9/00* (2006.01)
*B32B 19/06* (2006.01)
*C04B 35/573* (2006.01)
(Continued)

(52) U.S. Cl.
CPC .............. *C04B 35/573* (2013.01); *C04B 35/571* (2013.01); *C04B 35/62272* (2013.01); *C04B 35/62281* (2013.01); *C04B 35/62873* (2013.01); *C04B 35/62876* (2013.01); *C04B 35/62878* (2013.01); *C04B 35/62884* (2013.01); *C04B 2235/3839* (2013.01); *C04B 2235/3891* (2013.01); *C04B 2235/404* (2013.01); *C04B 2235/428* (2013.01); *C04B 2235/5244* (2013.01); *C04B 2235/5248* (2013.01); *C04B 2235/5264* (2013.01); *C04B 2235/614* (2013.01); *C04B 2235/616* (2013.01); *C04B 2235/656* (2013.01); *C04B 2235/6562* (2013.01); *C04B 2235/6565* (2013.01); *C04B 2235/6586* (2013.01); *C04B 2235/80* (2013.01); *Y10T 428/30* (2015.01)

(58) Field of Classification Search
None
See application file for complete search history.

(56) References Cited

U.S. PATENT DOCUMENTS 2,581,252 A * 1/1952 Goetzel et al. ................. 428/553
3,348,967 A * 10/1967 Hucke ............................ 427/399
(Continued)

FOREIGN PATENT DOCUMENTS

EP 0518619 12/1992
EP 0519643 12/1992
(Continued)

OTHER PUBLICATIONS

K.G. Ewsuk et al., "Characterizing and Modeling Organic Binder Burnout From Green Ceramic Compacts", SAMPE Technical Conference, Albuquerque, NM, Oct. 9-12, 1995.*
(Continued)

*Primary Examiner* — David Sample
*Assistant Examiner* — Nicole T Gugliotta
(74) *Attorney, Agent, or Firm* — Carlson, Gaskey & Olds, P.C.

(57) ABSTRACT

A refractory ceramic composite having a fibrous ceramic core and a solid ceramic coating is provided. An intermediate for making refractory composite ceramics is also provided. The intermediate includes a reaction product of a refractory metal and a carbon based felt, wherein a quantity of the refractory metal present is stoichiometrically non-equivalent to a quantity of carbon present during the formation of the reaction product so that the reaction product comprises a ceramic based felt having free, unreacted refractory metal thereon.

3 Claims, 3 Drawing Sheets

(51) Int. Cl.
*C04B 35/571* (2006.01)
*C04B 35/622* (2006.01)
*C04B 35/628* (2006.01)

(56) References Cited

U.S. PATENT DOCUMENTS

| | | | | |
|---|---|---|---|---|
| 3,672,936 | A * | 6/1972 | Ehrenreich | 428/408 |
| 4,481,257 | A * | 11/1984 | Suplinskas et al. | 428/366 |
| 4,580,524 | A * | 4/1986 | Lackey et al. | 118/725 |
| 4,735,850 | A * | 4/1988 | Eitman | 442/179 |
| 5,079,195 | A * | 1/1992 | Chiang et al. | 501/92 |
| 5,154,970 | A * | 10/1992 | Kaplan et al. | 428/304.4 |
| 5,205,970 | A * | 4/1993 | Brun et al. | 427/227 |
| 5,242,710 | A * | 9/1993 | Claar et al. | 427/248.1 |
| 5,252,361 | A * | 10/1993 | Frechette et al. | 427/255.24 |
| 5,336,350 | A * | 8/1994 | Singh | 156/155 |
| 5,441,762 | A * | 8/1995 | Gray et al. | 427/190 |
| 5,962,103 | A * | 10/1999 | Luthra et al. | 428/107 |
| 6,024,898 | A * | 2/2000 | Steibel et al. | 264/29.1 |
| 6,074,750 | A | 6/2000 | Brun et al. | |
| 6,347,446 | B1 * | 2/2002 | Luthra et al. | 29/402.18 |
| 6,517,341 | B1 * | 2/2003 | Brun et al. | 431/2 |
| 6,627,126 | B2 | 9/2003 | Schmidt et al. | 264/29.1 |
| 2002/0034624 | A1 * | 3/2002 | Harpell et al. | 428/298.1 |
| 2003/0132558 | A1 | 7/2003 | Schmidt et al. | |
| 2004/0247946 | A1 * | 12/2004 | Seitz | 428/698 |
| 2005/0129973 | A1 * | 6/2005 | Eaton et al. | 428/641 |
| 2005/0276961 | A1 * | 12/2005 | Sherwood et al. | 428/292.1 |

FOREIGN PATENT DOCUMENTS

| | | |
|---|---|---|
| EP | 0798280 | 10/1997 |
| EP | 1626036 | 2/2006 |
| EP | 1867619 | 12/2007 |

OTHER PUBLICATIONS

Silicon Carbide MSDS, http://www.espimetals.com/msds's/siliconcarbide.pdf.*
Chemical Elements.com—Silicon, http://www.chemicalelements.com/elements/si.html.*
Chemical Elements.com—Boron, http://www.chemicalelements.com/elements/b.html.*
Chemical Land 21—Boron Carbide, http://www.chemicalland21.com/industrialchem/inorganic/BORON%20CARBIDE.htm.*
ESPI MSDS for Boron Carbide, http://www.espi-metals.com/msds's/boroncarbide.pdf.*
Chemical Land 21—Vanadium Carbide, http://chemicalland21.com/industrialchem/inorganic/VANADIUM%20CARBIDE.htm.*
Chemical Elements.com—Vanadium, http://www.chemicalelements.com/elements/v.html.*
Panasyuk et al., "Kinetics of the reactions of boron carbide with liquid aluminum", Powder Metallurgy and Metal Ceramics, vol. 18, No. 7, pp. 487-480. 1979.*
European Search Report mailed Mar. 31, 2009.

* cited by examiner

REFRACTORY CERAMIC COMPOSITES AND METHODS OF MAKING

CROSS REFERENCE TO RELATED APPLICATIONS

This application is a continuation-in-part application of U.S. application Ser. No. 11/455,049 filed Jun. 16, 2006, now pending, the contents of which are incorporated by reference herein in its entirety.

BACKGROUND OF THE INVENTION

1. Field of the Invention

The disclosure relates to ceramic composites and, more particularly, the disclosure relates to refractory ceramic composites and methods of making.

2. Description of Related Art

Advanced propulsion and combustion applications require materials with thermal and compositional stability when exposed, in use, to aggressive environments above 1200 degrees Celsius (C.).

Refractory metal carbides, borides, oxides, nitrides, silicides and combinations thereof are particularly suitable materials because they can exhibit one or more of the following beneficial properties at high temperatures: relatively high strength, low density, tailorable thermal conductivity, electrical resistivity and oxidative resistance, controlled thermal expansion, etc. The specific property target values are selected based on the environmental conditions and the needs of the particular application.

Typical applications for refractory ceramic composites include, but are not limited to, thermal protection systems (TPS), insulation, erosion resistant structures, impact resistant structures, heat exchangers, catalytic devices or supports, and structural components. For some of these applications, controlled composition and porosity within a refractory structure enables beneficial thermal stability, weight reduction, strength-to-weight ratio or a superior flow field for cooling fluids with lower pressure drop.

However, preparation of such refractory ceramic composites is difficult, and frequently leads to unacceptable composition, pore structure or undesirable processing difficulties. For example, an unacceptable composition due to processing problems may result in the presence excess silicon carbide (SiC), carbon, and/or refractory metal, none of which may be desirable for a targeted application.

Accordingly, it has been determined by the present disclosure that there is a need for refractory ceramic composites and methods of making such composites that overcome, alleviate, and/or mitigate one or more of the above and other deleterious effects of prior art composites and methods.

SUMMARY OF THE INVENTION

A refractory ceramic composite having a fibrous core and a coating is provided. In a preferred embodiment, the fibrous core is ceramic-based and the coating is a solid ceramic-based coating.

An intermediate for making refractory ceramic composites is also provided. The intermediate includes a reaction product of a refractory metal and a carbon based felt, wherein a quantity of the refractory metal present is stoichiometrically non-equivalent to a quantity of carbon present during the formation of the reaction product so that the reaction product comprises a ceramic based felt having free, unreacted refractory metal thereon.

A process for making a refractory ceramic composite is provided. The method includes forming a ceramic based felt having free, unreacted refractory metal thereon and reacting a material with the free, unreacted refractory metal to form a ceramic coating on the ceramic based felt.

The above-described and other features and advantages of the present disclosure will be appreciated and understood by those skilled in the art from the following detailed description, drawings, and appended claims.

DETAILED DESCRIPTION

Figure 1:
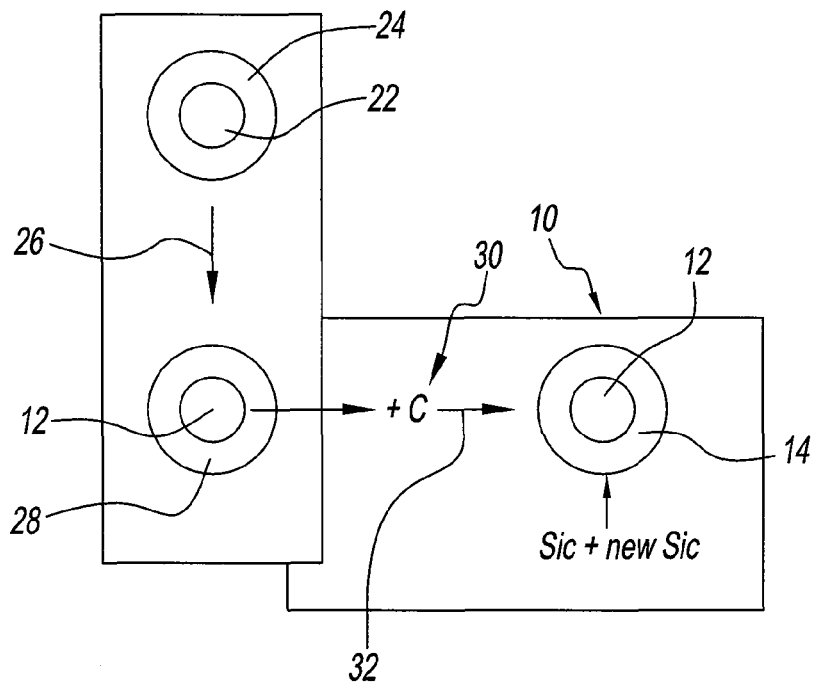
FIG. 1 illustrates an exemplary embodiment of a refractory ceramic composite according to the present disclosure.

Referring now to FIG. 1, an exemplary embodiment of a refractory ceramic composite according to the present disclosure is shown and is generally referred to by reference numeral 10. Advantageously, refractory ceramic composite 10 includes a fibrous ceramic core 12 and a solid ceramic coating 14.

In some embodiments, coating 14 can be continuously disposed on core 12, while in other embodiments the coating can be discontinuously disposed on the core. Ceramic coating 14 can have any desired thickness and the exterior surface of said coating can be uniformly smooth, textured or some regions can be smooth while others are textured with a desired roughness.

Figure 2:
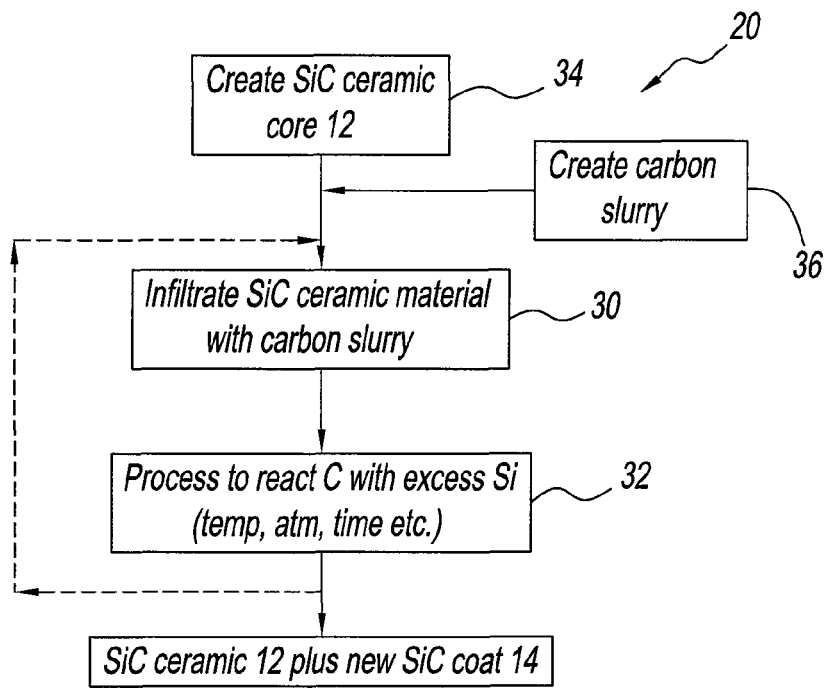
FIG. 2 is a flow chart illustrating an exemplary embodiment of a method of making the refractory ceramic composite of FIG. 1.

Refractory ceramic composite 10 can be understood from its method 20 of making, which is described with simultaneous reference to FIGS. 1 and 2.

In the illustrated embodiment, fibrous ceramic core 12 is a fibrous silicon carbide (SiC)-containing core. Core 12 can be formed from one or more carbon-based fibers 22. For example, carbon-based fibers 22 can be arranged in an activated carbon felt (ACF) in a manner known in the art. Carbon fibers 22 can be coated with a silicon layer 24 and exposed to one or more thermal processing steps 26 in a manner described in U.S. patent application Ser. No. 11/455,049, the contents of which are incorporated herein in their entirety by reference thereto, so that fibrous silicon carbide (SiC)-containing core 12 is the resultant reaction product of the carbon-based fibers 22 and silicon layer 24.

In the event that the stoichiometric ratio of carbon fibers 22 to silicon layer 24 is less than 1:1 for an ideal formula of SiC, then the fibrous SiC core can include free, unreacted silicon metal 28 thereon after exposure to processing steps 26.

Advantageously, method 20 makes use of free, unreacted silicon metal 28 to form solid silicon carbide (SiC) coating 14 on fibrous silicon carbide core 12. Thus, method 20 does not require processing steps 26 to occur and produce a 1:1 stoichiometric ratio of C to Si and, as such, can provide fibrous silicon carbide (SiC) core 12 with much less process control than previously possible. Further, method 20 advantageously makes use of the free, unreacted silicon metal 28 to form additional refractory ceramic phases of silicon carbide coating 14.

Method 20 uses the excess free unreacted silicon metal 28 by providing an additional source of carbon, followed by thermal processing 32 under a controlled atmosphere such as argon, to form new ceramic coating 14.

More particularly, method 20 includes a ceramic core formation step 34. During formation step 34, SiC-containing ceramic core 12 having free, unreacted silicon metal 28 thereon is formed. After formation step 34, the result of method 20 is an intermediate for making refractory ceramic composite 10 of the present disclosure. Here, the intermediate includes a reaction product of silicon metal 24 and the carbon based felt 22, wherein a quantity of the refractory metal 24 present is stoichiometrically non-equivalent to a quantity of carbon present in the felt during the formation of the reaction product so that the reaction product comprises a ceramic based felt having free, unreacted silicon metal 28 thereon.

Method 20 also includes a coating or infiltration step 30, where SiC-containing ceramic core 12 is coated or infiltrated with a source of carbon. The source of carbon can be any suitable carbon source such as, but not limited to, pre-ceramic polymers that create refractory phases such as carbides or borides plus excess carbon, phenolic precursors to glassy carbon, particulate carbon powder, and any combinations thereof, including mixtures of different pre-ceramic polymers. In a preferred embodiment, the source of carbon can be a pre-ceramic polymer-derived carbon such as that disclosed in Applicants own U.S. Pat. No. 6,627,126. The source of carbon can be prepared by preparation of a polymer-based carbon slurry during a source preparation step 36. The carbon source can also be supplied as a liquid, solid, solution or an aqueous or non-aqueous (organic solvent-based) dispersion. If the carbon source is delivered with a solvent or liquid transfer medium, an additional step may be required to remove unnecessary fluids. This step may involve heating, vaporization, freeze drying, filtration or combinations thereof. In embodiments where a pre-ceramic polymer carbon source creates excess carbon plus refractory borides, it is expected that SiC plus refractory metal borides can be created depending on the starting composition of the polymer (i.e., the refractory metal is provided in the starting polymer to create the corresponding refractory boride, $HfB_2$, $TaB_2$, $ZrB_2$, $NbB_2$, $TiB_2$, $WB_2$).

Next, method 20 includes one or more processing steps 32, which are sufficient (for example, controlled temperature, time, heating and cooling rates and atmosphere compositions) to cause free, unreacted silicon metal 28 on SiC-containing ceramic core 12 to react with carbon source from infiltration step 30 so that the resultant reaction product of the free, unreacted silicon metal and the carbon source is the formation of new SiC-containing ceramic coating 14 on the original SiC-containing core 12.

In some embodiments, method 20 can repeat infiltration step 30 and processing steps 32 any number of times using the same or different conditions.

It should be recognized that method 20 is described in use where fibrous ceramic core 12 and ceramic coating 14 comprise reaction products of silicon and carbon. Of course, it is contemplated by the present disclosure for ceramic core 12 and ceramic coating 14 to be formed of the reaction products of carbon with any desired refractory metal. For example, it is contemplated by the present disclosure for fibrous ceramic core 12 and ceramic coating 14 to comprise reaction products of carbon and a refractory metal selected from the group consisting of silicon, hafnium, tantalum, boron, tungsten, titanium, niobium, zirconium, molybdenum, vanadium and any combinations thereof.

Figure 3:
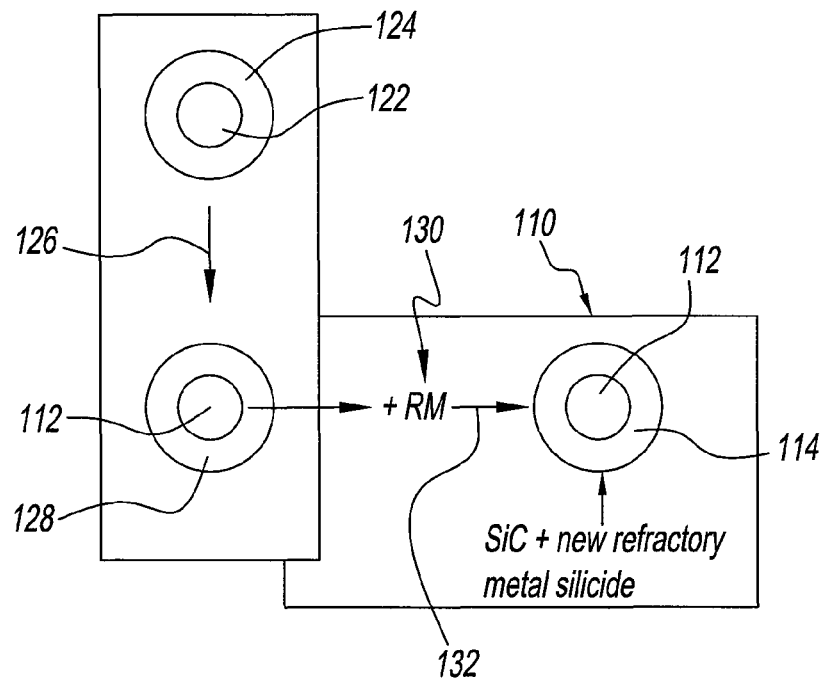
FIG. 3 illustrates an alternate embodiment of a refractory ceramic composite according to the present disclosure.
Figure 4:
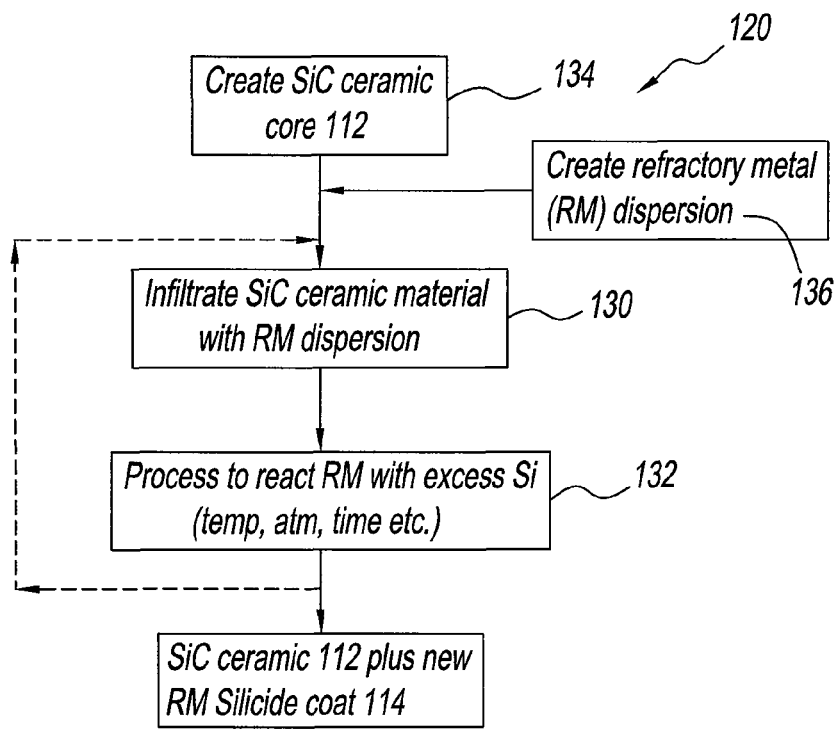
FIG. 4 is a flow chart illustrating an exemplary embodiment of a method of making the refractory ceramic composite of FIG. 3.

Referring now to FIGS. 3 and 4, an alternate embodiment of the refractory ceramic composite according to the present disclosure is shown. Here, component parts performing similar and/or analogous functions to the embodiment of FIGS. 1 and 2 are numbered in multiples of one hundred. Advantageously, refractory ceramic composite 110 includes a fibrous ceramic core 112 and a solid metal silicide-containing ceramic coating 114.

Coating 114 can be continuously disposed on core 112, while in other embodiments the coating can be discontinuously disposed on the core. Ceramic coating 114 can have any desired thickness, and the exterior surface of said coating can be uniformly smooth, textured or some regions can be smooth while others are textured with a desired roughness.

Refractory ceramic composite 110 can also be understood from its method 120 of making, which is described with simultaneous reference to FIGS. 3 and 4.

In the illustrated embodiment, fibrous ceramic core 112 is a fibrous silicon carbide (SiC)-containing core. Core 112 can be formed from one or more carbon fibers 122. For example, carbon fibers 122 can be arranged in an activated carbon felt (ACF) in a manner known in the art. Carbon fibers 122 can be coated with a silicon layer 124 and exposed to one or more processing steps 126 as described above so that fibrous silicon carbide-containing core 112 is the resultant reaction product of the carbon fibers 122 and silicon layer 124.

In the event that the stoichiometric ratio of carbon fibers 122 to silicon layer 124 is less than 1:1, the fibrous SiC-containing core can include free, unreacted metallic silicon 128 thereon after exposure to processing steps 126.

Advantageously, method 120 makes use of free, unreacted metallic silicon 128 to form solid metal silicide-containing coating 114 on fibrous silicon carbide-containing core 112. Thus, method 120 does not require processing steps 126 to occur and produce a 1:1 stoichiometric ratio of C to Si, and as such, can provide fibrous silicon carbide (SiC)-containing core 112 with much less process control than previously possible. Further, method 120 advantageously makes use of the free, unreacted metallic silicon 128 to form additional refractory ceramic phases in a solid metal silicide-containing coating 114.

Method 120 uses the excess free silicon metal 128 by providing an additional source of refractory metal during infiltration step 130, followed by processing steps 132 under controlled processing conditions (temperature, time, heating and cooling rates, atmosphere composition, pressure, etc.) to form solid metal silicide-containing coating 114. Argon is particularly useful as an atmosphere composition.

More particularly, method 120 includes a ceramic core formation step 134. During formation step 134, ceramic core 112 having free, unreacted silicon metal 128 thereon is formed.

Method 120 also includes a coating or infiltration step 130, where ceramic core 112 is coated or infiltrated with a source of refractory metal. The source of refractory metal can be any refractory metal source such as, but not limited to, a vapor deposited metal, a dispersion or slurry of one or more refractory metals and polymers containing such metals. If solvents or liquid dispersing agents are used, an additional step may be required to remove unwanted mass, such as evaporation of excess liquid. Methods of providing such refractory metals can be any chemical or physical vapor deposition method such as sputtering, CVD, spraying, plasma assisted vapor deposition, electrophoretic or electrostatic deposition, dipping, filtration or the like. The methods are preferably classified as non-line-of-sight methods. In addition to silicon as described above, the refractory metal used can be selected from the group consisting of hafnium, zirconium, titanium, niobium, molybdenum, tungsten, tantalum, boron, vanadium, and any combinations or alloys thereof. Preferably, the refractory metal reacts with the excess silicon at temperatures below the melting point of the refractory metal.

The source of refractory metals used during infiltration step 130 can be prepared during a source preparation step 136. In one embodiment, the source preparation step 136 includes dispersing the refractory metal in a pre-ceramic polymer that forms stoichiometric SiC upon conversion, and infiltrating the ceramic felt containing core 112 having excess Si with this polymer dispersion. Upon thermal conversion, the preceramic polymer would convert to solid ceramic SiC and the delivered refractory metal would react with the excess Si to form new refractory metal silicide in processing step 132.

Next, method 120 includes one or more thermal processing steps 132, which are sufficient to cause free, unreacted silicon metal 128 on ceramic core 112 to react with the refractory metal source provided by infiltration step 130 so that the resultant reaction product of the free, unreacted silicon metal and the additional refractory metal source is the formation of metal silicide-containing coating 114 on core 112.

Advantageously, the refractory metal provided during infiltration step 130 need not melt in order to react with the free, unreacted silicon metal 128 in order to react to form a new refractory metal silicide-containing coating 114, and thus, offers a lower processing temperature than melt infiltration methods known in the art.

In some embodiments, method 120 can repeat infiltration step 130 and processing steps 132 any number of times using the same or different conditions.

It should be recognized that method 120 is described in use where fibrous ceramic core 112 comprise reaction products of silicon and carbon. Of course, it is contemplated by the present disclosure for ceramic core 112 to be formed of the reaction products of carbon with any desired refractory metal. For example, it is contemplated by the present disclosure for fibrous ceramic core 112 to comprise reaction products of carbon and a refractory metal selected from the group consisting of silicon, hafnium, tantalum, boron, tungsten, titanium, niobium, zirconium, molybdenum, vanadium, and any combinations thereof.

EXAMPLE 1

Method 20 was followed to provide an experimental example of the present disclosure. During ceramic core formation step 34, an activated carbon felt (ACF) commercially available under the tradename CarboPur was coated with a layer of silicon (Si) metal 24 by a chemical vapor deposition (CVD) method by reducing dichlorosilane at 900° C. at low pressure. The resultant Si coating 24 was nominally 15-20 microns thick. The CVD process was controlled to deliver a relatively thick Si coating (i.e. more Si available than C, such that the relative atomic ratio of C to Si was less than 1:1) that intentionally produced a Si-rich structure 12 with SiC upon conversion via thermal processing steps 26.

Next, during source preparation step 36, a polymer precursor to SiC with excess carbon was prepared. The polymer precursor selected is commercially available from Starfire Systems under the designation SMP-75. Here, a sample of SMP-75 was infiltrated during infiltration step 30 into the porous SiC ceramic structure 12. Infiltration step 30 occurred by dipping/gravity feed, but can be enhanced by use of reduced pressures. The infiltrated article was subsequently thermally treated (pyrolyzed) to 1500° C. in argon during reaction step 32. It is contemplated by the present disclosure for reaction step 32 to occur at temperatures lower than 1500° C., particularly if intermediate curing steps are desired to solidify the polymer. Upon completion of reaction step 32, the resulting structure contained the original SiC ceramic in structure 12, SiC produced by the conversion of the preceramic polymer, plus addition SiC product resulting from the reaction between the excess carbon from the polymer and the excess Si from the silicon-rich structure 12.

EXAMPLE 2

Here, as in Example 1, method 20 was used to create a Si-rich structure 12 with SiC upon conversion via thermal processing steps 26.

Next, during source preparation step 36, a polymer precursor to SiC with excess carbon was prepared. The polymer precursor selected is commercially available from Starfire Systems under the designation SMP-75. A slurry containing hafnium metal dispersed in SMP-75 at room temperature was infiltrated during infiltration step 30 into the porous SiC ceramic structure 12. Infiltration step 30 of the slurry occurred by dipping/gravity feed, but can be enhanced by use of reduced pressures. The infiltrated article was subsequently thermally treated (pyrolyzed) to 1500° C. in argon for approximately 1 hour during reaction step 32. A heating rate of approximately 10 degrees per minute was used. It is contemplated by the present disclosure for reaction step 32 to occur at temperatures lower than 1500° C., particularly if intermediate curing steps are desired to solidify the polymer.

Upon completion of reaction step 32, the resulting structure contained the original SiC ceramic in structure 12, SiC produced by the conversion of the preceramic polymer, additional new SiC product resulting from the reaction between the excess carbon from the polymer and the excess Si from the silicon-rich structure 12, and new hafnium carbide (HfC) resulting from the reaction of excess carbon from the polymer with the added hafnium metal. Thus, a refractory ceramic composite containing both SiC and HfC was created.

Figure 5A:
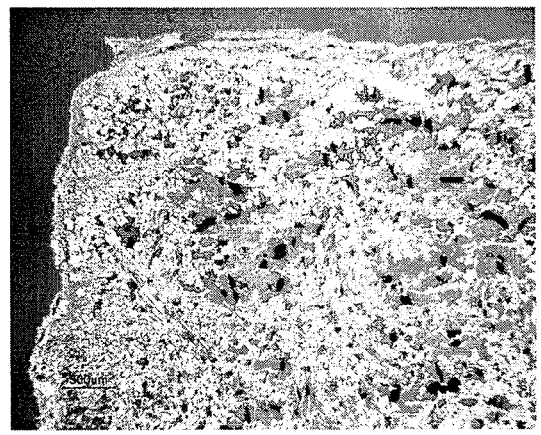
FIG. 5 illustrates representative optical microphotographs of an exemplary embodiment of a refractory ceramic composite produced by the method of FIG. 2.

FIG. 5 illustrates representative optical microphotographs of typical cross sections of the refractory ceramic composite produced using method 20. FIG. 5A illustrates an overview image showing edge of infiltrated and converted SiC felt. FIG. 5A shows a large field image showing an edge of the article. Porosity and granular particular matter are visible, as is the remnant structure of converted carbon fibrous material.

Figure 5B:
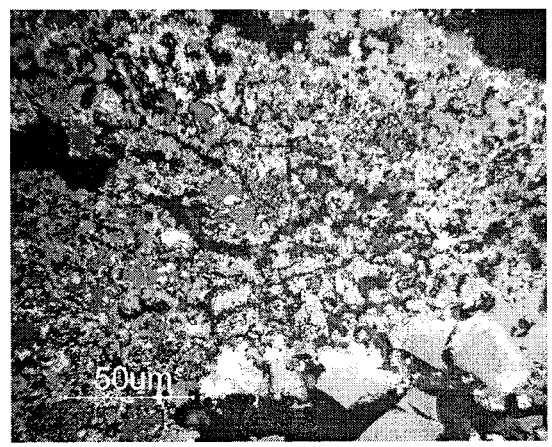
Figure 5C:
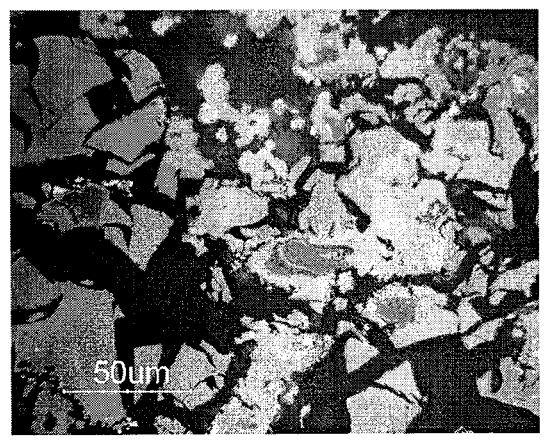

FIGS. 5B and 5C are magnified images showing particulate material and reaction zones within the article. Here, some residual porosity is visible, but it is believed by the present disclosure that the porosity can be controlled with variation of conditions of the method 20. FIGS. 5B and 5C are magnified images and clearly show evidence of reaction zones surrounding (originally present, but converted) carbon fiber cores. The reaction zones confirm the reaction of the added refractory metal, and/or the excess carbon from the polymer, with the excess Si from the CVD deposition process. The structure appears to have some residual porosity, but this can be reduced with additional infiltration and conversion steps, similar to the "polymer-infiltration-pyrolysis" (PIP) method used for fabricating ceramic matrix composites.

EXAMPLE 3

Here, a portion of a polymer precursor to SiC containing a small excess of carbon was mechanically mixed by with an amount of hafnium metal. The polymer precursor selected is commercially available from Starfire Systems under the designation SMP-10. Approximately 7.6 grams of SMP-10 was mixed with approximately 2.3 grams of hafnium metal and thermally processed (pyrolyzed) to 1500° C. in argon for approximately 1 hour during reaction step 32. The reaction product was determined by powder X-ray diffraction techniques to contain SiC from the polymer plus new HfC from the reaction of the excess carbon from the SMP-10 with the previously added hafnium metal. No free Hf was observed by X-ray diffraction. This example demonstrates that new refractory carbide ceramic phases can be created by controlling the relative amount of added refractory metal and excess carbon.

EXAMPLE 4

Here, a portion of a polymer precursor to SiC containing a small excess of carbon was mechanically mixed with a quantity of hafnium metal and a quantity of silicon metal. The polymer precursor selected is commercially available from Starfire Systems under the designation SMP-10. Approximately 8 grams of SMP-10 was mixed with approximately 2 grams of hafnium metal and 2 grams of silicon metal and thermally processed (pyrolyzed) in separate experiments to 1000° C. and 1500° C. in argon for approximately 2 hours. The 1000° C. reaction product was determined by powder X-ray diffraction techniques to contain unreacted Si, unreacted Hf, nanocrystalline SiC from the converted polymer and minor amounts of nanocrystalline HfC. The 1500° C. reaction product was determined by powder X-ray diffraction techniques to contain unreacted Si, nanocrystalline SiC from the converted SMP-10 and hafnium silicide, $HfSi_2$ formed by the reaction of the hafnium metal and the silicon metal. No significant amounts of HfC were detected. This example demonstrates the favorable reaction of Hf with excess Si to create desired refractory silicide ceramic by controlling the reaction stoichiometry to provide sufficient silicon metal.

Advantageously, it is believed that refractory ceramic composite 10, 110 of the present disclosure can find use as components of thermal protection system (TPS) for aerospace applications, including hypersonic applications, lightweight armor components having curved and/or angled shapes, ceramic matrix composites, compositionally or functionally graded ceramic-containing structures, high temperature heat exchangers or structural components, high temperature filters, catalytic substrates/reactors or supports, environmental/thermal barrier layers, internal components of laminate structures, and others.

Moreover, refractory ceramic composite 10, 110 of the present disclosure can be provided at a lower cost using readily available starting materials (e.g., carbon felts and fabrics available in a wide variety of densities) than previously possible. Further, refractory ceramic composite 10, 110 of the present disclosure have a fibrous morphology that offers higher surface area and improved flow versus conventional foam structures. The composition of the refractory ceramic composite 10, 110 can be varied easily through variation of processing conditions.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A refractory ceramic composite, comprising a solid monolithic fiber core formed of silicon carbide-containing ceramic material and a solid ceramic coating continuously disposed directly on said solid monolithic fiber core, said solid ceramic coating includes a carbide of molybdenum, tungsten boride, or combinations thereof.

2. The refractory ceramic composite of claim 1, wherein said solid monolithic fiber core comprises a ceramic based felt.

3. A refractory ceramic composite, comprising a solid monolithic fiber core formed of silicon carbide-containing ceramic material and a solid ceramic coating continuously disposed directly on said solid monolithic fiber core, said solid ceramic coating comprises tungsten silicide.

* * * * *